Dec. 26, 1961     D. R. AYER ET AL     3,015,081
TRANSMISSION LINE MODULATOR UNIT
Filed May 11, 1960     3 Sheets-Sheet 1

Donald R. Ayer
Arnold N. McDowell
INVENTORS

David A. Rick
ATTORNEY

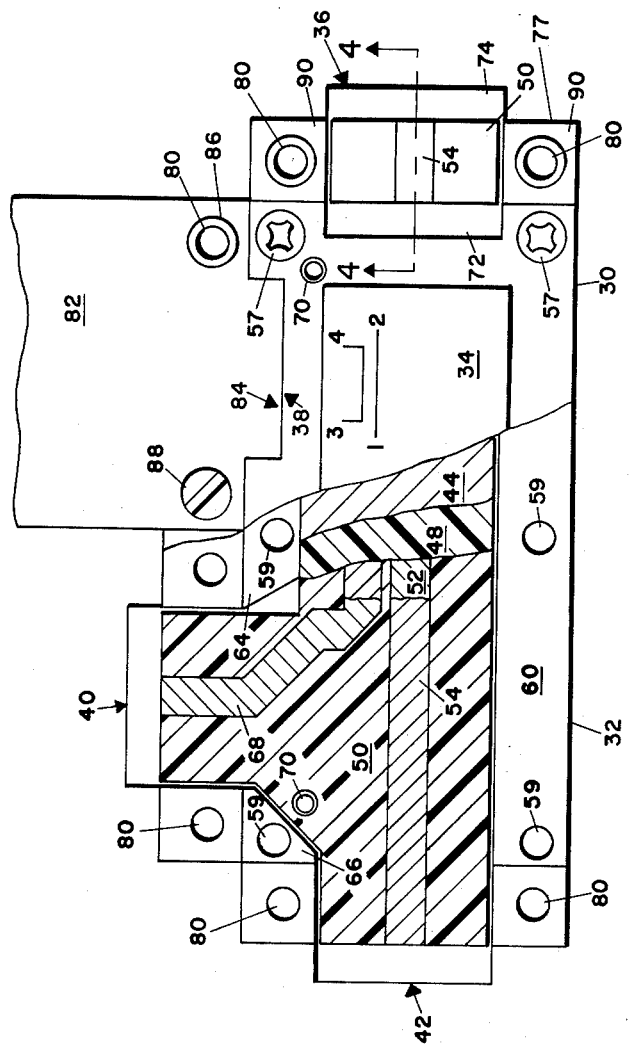

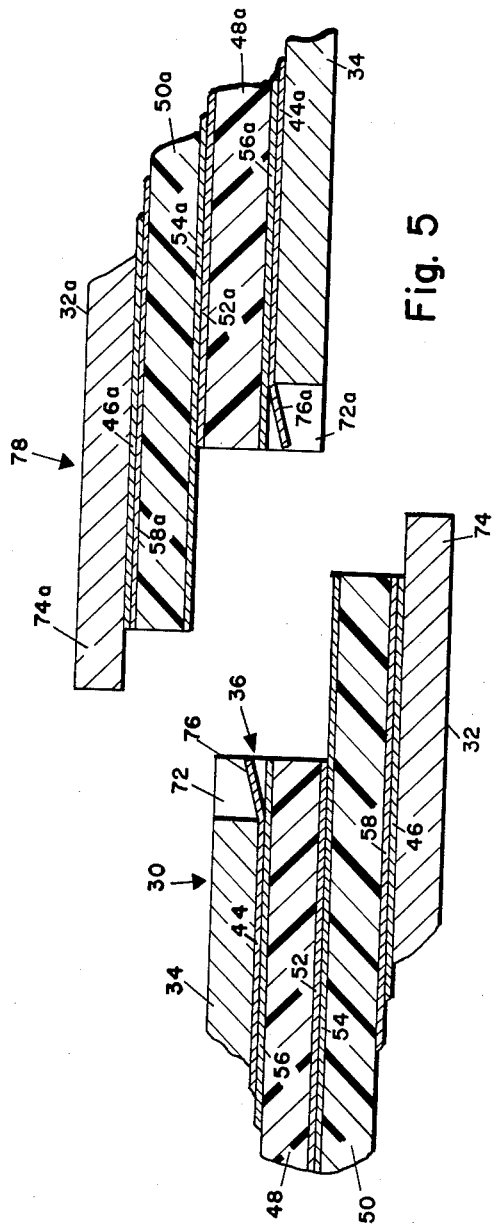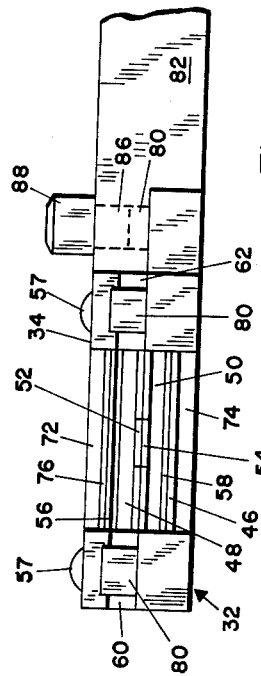

United States Patent Office 3,015,081
Patented Dec. 26, 1961

3,015,081
TRANSMISSION LINE MODULAR UNIT
Donald R. Ayer, Nashua, and Arnold N. McDowell, Amherst, N.H., assignors to Sanders Associates, Inc., Nashua, N.H., a corporation of Delaware
Filed May 11, 1960, Ser. No. 28,409
4 Claims. (Cl. 333—97)

This invention relates to the art of high frequency transmission lines. More particularly, it involves the incorporation of strip transmission lines in modular systems, thereby permitting quick construction and rearrangement of various circuits.

Our invention is directed primarily to laboratory circuit construction, although its utility is not limited to such use. Such circuits are generally constructed for either of two reasons. The first involves design and testing of the circuits themselves for incorporation in equipment of various types. Before the designs are optimized, there are often many changes in the values of circuit parameters as well as addition, removal or rearrangement of various elements or components. In high frequency work where transmission lines and wave guides are used to conduct electromagnetic energy, these elements include hybrid rings, directional couplers and power dividers, as well as filters and other components used in low frequency work. Circuit changes often involve the laborious, time-consuming task of cutting, trimming, splicing and soldering lengths of transmission line or wave guide and, in many cases, actual construction of the circuit elements themselves. Consequently, the resulting cost of circuit modifications is often a significant part of the over all cost of the end item.

Laboratory circuits are also constructed as part of test equipment for testing various types of apparatus. In many cases, usage of a test circuit is limited to a particular piece of apparatus, and, after the tests have been completed, the circuit is of no further utility. The various elements in the circuit are generally not readily salvageable, and therefore, a cost of construction of test circuits results from both the extensive time required to fabricate the circuit and the expense involved in salvaging elements for use in other circuits. The salvage problem is also encountered in the case of construction for design purposes, inasmuch as, once an optimum design is obtained, the laboratory circuit has no further commercial value.

Accordingly, it is a principal object of our invention to provide a system of high frequency transmission line components which may be easily assembled into desirable circuit configurations.

Another object of our invention is to provide a component system of the above character in which the circuits may be readily rearranged.

A further object of our invention is to provide a component system of the above type in which circuits may be readily disassembled without damaging the various elements thereof.

Yet another object of our invention is to provide a system of the above type requiring minimum space for the assembly of a circuit.

Another object of our invention is to provide a component system of the above character in which prototype circuits may be constructed with the exact configuration and characteristics of mass-produced replicas thereof.

A still further object of our invention is to provide component units for use in the above system wherein the circuit interruptions between units will not effectively disturb the desired electrical characteristics of the circuit to be made therefrom.

Other objects of our invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

In general, our transmission line system comprises a plurality of directly interconnected modular units containing various circuit elements and using strip transmission line comprising first and second center conductors disposed between first and second ground plane conductors. Each of the units includes a connecting portion joined to a corresponding connecting portion of another unit. Each of the connecting portions comprises a partial transmission line section including the first center and ground plane conductors, the line being cut away in this section to expose the surface of the first center conductor facing away from the first ground plane conductor, whereby the exposed surfaces of the first center conductor of the connecting portions are in contact with each other. The connecting portions also include means for connecting the first ground plane conductor of each portion to the adjacent ground plane conductor of the corresponding connecting portion of the next unit.

Further in accordance with our invention, the ground plane conductors of each module are in contact with those of the other modular unit adjacent to the exposed portions of the first center conductor of the respective connecting portions. Also, each of these conductors preferably includes an overlapping member in contact with the first ground plane conductor thereof and also in overlapping contact with the adjacent ground plane conductor of the connecting portion of the next module joined thereto.

Thus, the joining of two modules provides an essentially abutting relationship between the corresponding transmission line conductors connected thereby. The actual electrical connections are provided by those conductors which overlap each pair of abutting conductors. In the case of each pair of abutting center conductors, the overlap is provided by the other center conductor. The ground plane conductors are overlapped by integral extensions of the housings of the modules. Contact pressure is maintained by a combination of resiliency of certain conductors, the inter-relationship of various dimensions and locking screws which maintain the connections between the modules.

As will be seen below, our system provides complete flexibility, since the modules and their integral standard connectors may be joined together in any desirable circuit arrangement. Moreover, assembly and disassembly is accomplished rapidly without damage to any of the circuit elements.

For a fuller understanding of the nature and objects of the invention, reference should be had to the following detailed description taken in connection with the accompanying drawings, in which:

FIG. 3 is a top plan view of one of the modules partly broken away to show interior parts and further showing the connection between the module and another module fragmentarily shown in plan view.

FIG. 4 is a section taken along line 4—4 of FIG. 3, showing the connecting portion of the module.

FIG. 5 is a view similar to FIG. 4 showing in section the connecting portion of another module and illustrating the mode of interconnection between the two modules, and FIG. 6 is an elevational view taken from the right end of the module in FIG. 3.

Figure 1:
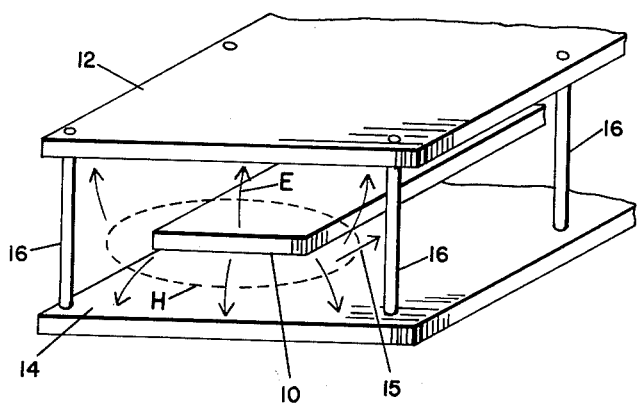
FIG. 1 is a simplified perspective view of a section of strip transmission line.

In FIG. 1 we have illustrated the field distribution in a typical strip transmission line. The line has an inner conductor 10 situated between and parallel to a pair of outer or ground plane conductors 12 and 14. The conductors 10, 12 and 14 are flat and may be quite thin. For example, they may be formed of foil made to adhere to dielectric material (not shown) filling the space between them. At an instant of time when the conductor 10 is positive with respect to the ground planes 12 and 14 and the current in the conductor 10 is in the direction of the arrow 15, the field distribution in the transmission line is as shown in FIG. 1, with the solid arrows representing the electric field E and the dash lines representing the magnetic field H.

The field configuration of FIG. 1 is indicative of the TEM propagation mode, more fully discussed in U.S. Patent No. 2,812,501, which issued November 5, 1957 to D. J. Sommers for "Transmission Line." However, it is possible to transmit other modes on the line under certain conditions. For example, if the inner conductor 10 is offset from its nominal position midway between the ground planes 12 and 14, the ground planes will be at somewhat different potentials. This difference in voltage will support a parallel plate mode. Accordingly, the ground planes are "shorted" together by a plurality of pins 16 spaced along both edges of the inner conductor. The pins impose an equipotential condition on the planes and thereby suppress this mode. For effective suppression, the spacing of the pins in the lengthwise direction of the line should be less than a half wavelength. Ordinarily, this spacing is on the order of one-eight wavelength or less.

Another limitation on pin spacing results from the desirability of avoiding a resonant condition in any loop defined by the ground planes and a pair of adjacent pins. A resonant loop will distort the transmission characteristics of the line as well as facilitate radiation of energy therefrom. Resonance occurs when the length of the loop is an integral number of wavelengths, and, accordingly, the distance between adjacent pins should be considerably less than the spacing providing a wavelength loop.

If either of the transverse dimensions, i.e., ground plane to ground plane or pin to pin spacing is greater than a half wavelength, a transverse electrical waveguide mode may be excited. Therefore, both these dimensions should be less than a half wavelength. There is also a restriction on the length of the circumferential path around the inner conductor 10 and passing midway between the inner conductor and the ground planes 12 and 14 and pins 16. This path should be less than a wavelength. Otherwise, the line will support a higher order transverse electric transmission line mode.

Figure 2:
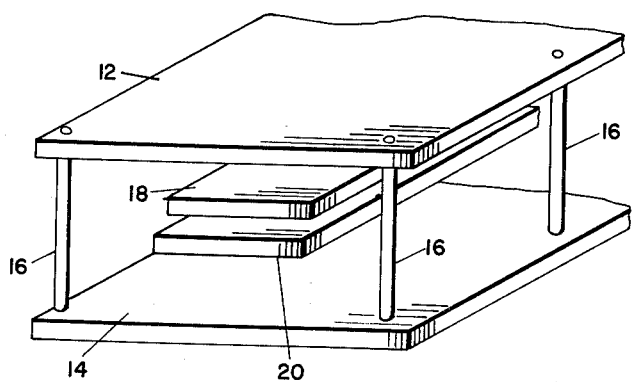
FIG. 2 is a simplified perspective view of a strip line using a double inner conductor.

In FIG. 2, there is shown a variation of strip line used in our modular units. The line has a pair of center conductors 18 and 20 generally, though not necessarily, in contact with each other. Transmission line of this type is more fully disclosed in U.S. Patent No. 2,810,892, which issued October 22, 1957 to Daniel Blitz for "Transmission Line." Its use is highly advantageous in conditions where the line is subject to flexure. In a line with a single center conductor, flexure will produce variations in the spacing between the conductor and ground planes in such manner as to substantially change the characteristic impedance of the line. In a line using a pair of center conductors as in FIG. 2, with each conductor affixed to a separate piece of dielectric material, flexure will cause the center conductors to part, but their distances from the respective adjacent ground planes remain substantially unchanged. It has been found that with this arrangement the characteristic impedance of the line is virtually unaffected.

The foregoing advantage of double center conductor line is of considerable importance in the connections between the various modules, since flexure may well occur at these connections when bending stresses are imposed thereon. Other advantages include the maintenance of good electrical contact between the center conductors of connected modules and relative ease of fabrication, as set forth more clearly below.

As seen in FIGS. 3, 4, and 6, a module generally indicated at 30 is housed in a base member generally indicated 32, topped by a cover 34. The module is provided with connecting portions generally indicated at 36, 38, 40 and 42 for connection to similarly constructed modules to form a circuit of any desirable electrical configuration. To this end, the individual modules contain various high-frequency circuit elements. For example, the module 30 contains a directional coupler whose four ports are available at the connectors 36, 38, 40 and 42. This is shown symbolically as 1, 2, 3, 4 on cover 34 in FIG. 3.

The various transmission line components within the module 30 are sandwiched between the cover 34 and base 32. Thus, ground plane conductors 44 and 46, adjacent to the cover and base, have a pair of circuit boards 48 and 50 disposed between them. The boards 48 and 50 are preferably made of elongated Teflon Fiberglas insulating panels which form the dielectric material of the transmission line and bonded to them are a pair of center conductors 52 and 54 in intimate contact with each other. The characteristic impedance of the transmission line depends in part upon the spacing between the conductors 52 and 54 and the ground planes 44 and 46. If the circuit boards 48 and 50 are not thick enough to provide the required spacing, shims 56 and 58, of the same material as the boards, may be added to give the desired thickness.

As seen in FIGS. 3 and 6, the cover 34 is secured by screws 57 threaded into holes 59 in vertical portions of the base member 32. These portions include a wall 60 extending along one side of the module 30 and posts 62 (FIG. 6), 64 and 66 (FIG. 3) on the other side. The base member 32 and cover 34 are preferably metallic, and thus, the vertical portions of the base member function as mode suppressors interconnecting the ground plane conductors in the same manner as the pins 16 of FIGS. 1 and 2. It will be noted that these portions fit closely around and follow the contour of the center conductors 52 and 54 as well as a pair of conductors indicated at 68 forming a line between the connectors 38 and 40. The portions of the two transmission lines in close proximity to each other form a parallel line directional coupler.

As shown in FIG. 3, the circuit boards 48 and 50 and center conductors 52 and 54 mounted thereon are accurately located within the module 30 by pins 70 extending through accurately located holes in the cover 34 and base member 32 as well as the circuit boards themselves. From FIG. 6 it is seen that vertical stability of the various parts is provided by making the thickness of the enclosed components slightly greater than the height of the vertical parts of the base member 32 to which the cover 34 is attached. Accordingly, the cover is bowed slightly when secured in place and serves as a spring applying pressure on the parts therebeneath.

The connecting portion 36, which has the same construction as the connection portions 38, 40, and 42 is shown in detail in FIGS. 3 and 4. It is provided with a keyway 72 in the form of a recess in the cover 34 and corresponding key 74, formed as an extension of the base member 32. The ground plane conductor 44 is terminated in a spring tab 76 bent upwardly from the circuit board 48 and shim 56 and substantially coextensive therewith when forced downwardly against them. The center conductor 52 and circuit board 48 are coextensive with the cover 34 and the vertical portions of the base member 32 on which the cover is mounted. The conductor 54 and circuit board 50 extend beyond the board 48 to terminate at the end 77 of the base member 32 adjacent to the key 74. The ground plane conductor 46 is coextensive with the board 50.

In FIG. 5, we have illustrated connecting portion 78 which is part of another module (not shown). As to the parts shown in FIGS. 4 and 5, this portion 78 is identical to connection 36 in inverted position, and, to aid in identifying the corresponding parts, those in FIG. 5 have been given the same reference numbers as those in FIG. 4, with the addition of the suffixes "a."

The connection portions 36 and 78 may be joined by moving portion 78 downwardly and to the left (FIGS. 4 and 5) to bring the key 74a down onto the spring tab 76 in the keyway 72 and move the spring 76a down onto the key 74, which then fits into the keyway 72a. The spring tabs 76 and 76a thus lie flat against the adjoining surfaces of the keys 74a and 74 and abut the ground plane conductors 46a and 46, respectively. Thus, there is electrical continuity between the ground plane conductors 44 and 46a as well as between the conductors 46 and 44a. The spring tabs 76 and 76a assure low resistance paths between adjacent ground plane conductors by means of the pressure exerted by them on the keys 74a and 74.

Still referring to FIGS. 4 and 5, the mating of connecting portions 36 and 78 also brings the center conductor 54a into a position overlying the center conductor 54. The conductors 52 and 54a thus form one center conductor of a double center conductor transmission line, and the conductors 54 and 52a form the other center conductor.

It will be apparent that it is unlikely that there will be physical contact between the coplanar ground plane and center conductors when connections 36 and 78 are joined. To provide direct contact for each pair of conductors would require extremely rigorous tolerance limitations in manufacture. However, the electrical properties of connections made with our connectors are essentially unaffected by interrupting gaps of this nature because of the overlapping nature of each electrical connection. Thus there is conduction between the ground plane conductors 44 and 46a by way of the contact between the spring tab 76 and the base member 32a. Similar continuity is provided by the contact between the spring tab 76a and key 74. Electrical connections between the coplanar center conductors are fostered by the extensive contact between the conductors 54 and 54a. We have found that, with connections of this type, dielectric gaps of approximately 0.02 inch at frequencies up to 7,000 megacycles may be tolerated without an appreciable discontinuity in characteristic impedance of the line. Preferably, the gaps are offset from one another as shown in FIGS. 4 and 5.

The manner in which the connecting portions are correctly positioned and contact pressure maintained between the contacting conductors is shown in FIG. 3. Here connections 36—42 are provided with internally threaded tubular guide pins 80 extending upwardly from the base member 32. The guide pins fit into cooperating holes in connection portions joined to the connections 36—42, thereby accurately locating the mating connections with respect to each other. Thus, a module fragmentarily shown at 82 includes a connection portion generally indicated at 84 joined to connection 38 of the module 30. Connection 84 is provided with guide holes 86 which fit the pins 80 of connection 38. The downward force on connection 84 required to insure electrical contact with connection 38, is provided by screws 88 threaded into the pins 80 and bearing down on connection 84.

Thus, the force exerted by the screws 88 against the spring tabs 76 and 76a (FIGS. 4 and 5) insures adequate contact between the ground plane conductors of connected modules. The manner in which low resistance contact between overlapping center conductors is maintained will be understood from inspection of FIG. 6. As shown therein, the combined thickness of the ground plane 46 and circuit board 50 is great enough to bring the center conductor 54 above the surface 90 (FIGS. 3 and 6) of connecting portion 36. The same relationship is true of the corresponding parts of a connection joined to connection 36. That is, the combined circuit board 50a and ground plane conductor 46a of connection 78 extend below the adjoining surface (not shown) of the base member 32a forming a part of connection 78. Thus, when the screws 88 (FIG. 3) are tightened, the overlapping center conductors of the mating connectors come into contact before contact between the surface 90 connection 36 and the corresponding surface of connection 78.

Thus, we have described a modular system for construction of high frequency circuits incorporating various transmission line elements. The system uses standard modular units, each of which contains one or more circuit elements such as directional couplers, hybrid rings, power dividers, filters or lengths of ordinary transmission line. Preferably, the units all have standard size, so that they may be compactly fitted together in a minimum of space.

The system uses strip transmission line, which is readily adaptable to a modular type of arrangement, particularly, in the novel connections described above. The connecting portions make use of overlapping conductors, both in the ground planes and the center conductors, to provide excellent electrical contact with minimal field distortion and change of characteristic impedance. The connection arrangement protects the electrical properties of the system against flexure resulting from handling. Moreover, the connecting portions provide quick connection and disconnection of the various modular units without damage thereto, thus facilitating circuit changes as well as permitting reuse of the various circuit elements in other circuits.

Another important advantage of our system is that is permits laboratory construction of circuits whose physical arrangement may be duplicated in mass production through printed circuit techniques of construction of stripline circuits. Thus there will be a minimum change in circuit characteristics between the optimized laboratory setup and the succeeding production model.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A modular unit for use in a transmission line system comprising a plurality of directly similarly interconnected modular units, each of said units incorporating strip transmission line and being comprised of first and second opposing portions, said first opposing portion including a first ground plane conductor, a first center conductor and a first insulator disposed therebetween, said second opposing portion including a second ground plane conductor, a second center conductor and a second insulator disposed therebetween, said portions being disposed with said center conductors in contact with each other, said unit having a housing comprising a first electrically conducting covering member adjacent said first ground plane and a second electrically conducting covering member adjacent said second ground plane, each of said units having a first connecting portion which includes a key in the form of an extension of said second member beyond said second ground plane, means forming a corresponding keyway in said first member, said first opposing portion of said transmission line being cut away in said first connecting portion to expose said second center conductor, whereby said second center conductor may be in overlapping contact with said second center conductor of a unit joined to said first unit, said key of each of said units being disposed in the keyway of the other unit and in overlapping contact with the first ground plane conductor thereof, said first ground plane conductor being provided with spring bias urging it outwardly in said keyway, thereby to insure contact with the key of the other said units, and means connected to said members to press together said first connecting portions of said units to maintain electrical contact between the overlapping conductors thereof.

2. The combination defined in claim 1 in which said second portion of said transmission line is disposed in a recess in said second member, said first member being generally coextensive with said first ground plane conductor in said first connecting portion, whereby when said units are joined together they have opposed surfaces of their second members generally coextensive with the second portions of said transmission line, and locating pins extending from said opposing surface of said first connecting portions.

3. The combination defined in claim 1 including vertical conducting portions electrically interconnecting said first and second ground plane conductors and following closely the portions of said transmission line within said unit.

4. A modular unit for use in a transmission line system comprising a plurality of directly similarly interconnected modular units, each of said units incorporating strip transmission line and being comprised of first and second opposing portions, said first opposing portion including a first ground plane conductor, a first center conductor and a first insulator disposed therebetween, said second opposing portion including a second ground plane conductor, a second center conductor and a second insulator disposed therebetween, said portions being disposed with said center conductors in contact with each other, said unit having a housing comprising a first electrically conducting covering member adjacent said first ground plane and a second electrically conducting covering member adjacent said second ground plane, each of said units having a first connecting portion which includes a key in the form of an extension of said second member beyond said second ground plane, means forming a corresponding keyway in said first member, said first opposing portion of said transmission line being cut away in said first connecting portion to expose said second center conductor, whereby said second center conductor may be in overlapping contact with said second center conductor of a unit joined to said first unit, said key of each of said units being disposed in the keyway of the other unit and in overlapping contact with the first ground plane conductor thereof, bias means urging said first ground plane conductor into electrical contact with the key of the other said units, and means connected to said members to press together said first connecting portions of said units to maintain electrical contact between the overlapping conductors thereof.

References Cited in the file of this patent

FOREIGN PATENTS 1,176,031    France _____ Nov. 17, 1958

OTHER REFERENCES

Sanders: Handbook of Tri-Plate Microwave Components. Copyright 1956, pages 37–40.